(12) United States Patent
Thelin et al.

(10) Patent No.: US 8,134,798 B1
(45) Date of Patent: Mar. 13, 2012

(54) DISK DRIVE MAINTAINING A SUBSTANTIALLY CONSTANT HOST TRANSFER RATE WHEN READING DATA FROM VARYING DATA RATE DATA TRACKS ACROSS MULTIPLE DISK SURFACES

(75) Inventors: Gregory B. Thelin, Garden Grove, CA (US); Dalwinder Singh, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 1845 days.

(21) Appl. No.: 11/287,515

(22) Filed: Nov. 23, 2005

(51) Int. Cl.
G11B 5/596 (2006.01)
G11B 5/09 (2006.01)
G11B 20/10 (2006.01)

(52) U.S. Cl. .................. 360/78.04; 360/39; 360/48
(58) Field of Classification Search .................. None
See application file for complete search history.

(56) References Cited

U.S. PATENT DOCUMENTS

| | | | |
|---|---|---|---|
| 5,510,905 A * | 4/1996 | Birk | 386/206 |
| 5,596,458 A | 1/1997 | Emo et al. | |
| 5,710,943 A | 1/1998 | Burton et al. | |
| 5,812,755 A | 9/1998 | Kool et al. | |
| 5,870,237 A | 2/1999 | Emo et al. | |
| 5,949,603 A | 9/1999 | Brown et al. | |
| 6,005,725 A | 12/1999 | Emo et al. | |
| 6,091,559 A * | 7/2000 | Emo et al. | 360/48 |
| 6,108,286 A | 8/2000 | Eastty | |
| 6,130,796 A | 10/2000 | Wiselogel | |
| 6,137,644 A | 10/2000 | Hetzler et al. | |
| 6,172,839 B1 | 1/2001 | Ahn | |
| 6,182,250 B1 | 1/2001 | Ng et al. | |
| 6,195,218 B1 | 2/2001 | Guttmann et al. | |
| 6,256,160 B1 | 7/2001 | Liikanen et al. | |
| 6,396,654 B2 | 5/2002 | Jeong et al. | |
| 6,466,387 B1 | 10/2002 | Ogasawara et al. | |
| 6,493,176 B1 | 12/2002 | Deng et al. | |
| 6,557,058 B1 | 4/2003 | Jackson | |
| 6,560,052 B2 | 5/2003 | Ng et al. | |
| 7,463,438 B2 * | 12/2008 | Kosugi et al. | 360/31 |
| 2002/0039246 A1 | 4/2002 | Ding et al. | |
| 2004/0136104 A1 | 7/2004 | Chiao et al. | |
| 2004/0179292 A1 | 9/2004 | Zayas et al. | |

FOREIGN PATENT DOCUMENTS

JP 07006492 A * 1/1995

* cited by examiner

*Primary Examiner* — Daniell L Negron (57) ABSTRACT

A disk drive is disclosed having a plurality of disk surfaces, wherein each disk surface comprises a plurality of data tracks, and each data track comprises a plurality of data sectors. When a read command is received from a host, data is read from first and second data sectors on first and second disk surfaces, respectively, in response to the read command, wherein the first data sector stores data at a first data rate, and the second data sector stores data at a second data rate substantially less than the first data rate. The data is transferred to the host at a substantially constant average transfer rate. In this manner, the disk drive does not appear abnormal to a benchmark program that reads a plurality of data sectors across multiple disk surfaces.

23 Claims, 10 Drawing Sheets

DISK DRIVE MAINTAINING A SUBSTANTIALLY CONSTANT HOST TRANSFER RATE WHEN READING DATA FROM VARYING DATA RATE DATA TRACKS ACROSS MULTIPLE DISK SURFACES

BACKGROUND OF THE INVENTION

1. Field of the Invention

The present invention relates to disk drives for computer systems. More particularly, the present invention relates to a disk drive maintaining a substantially constant host transfer rate when reading data from varying data rate data tracks across multiple disk surfaces.

2. Description of the Prior Art

Prior art disk drives employ one or more disks with heads actuated over the respective disk surfaces (e.g., top and bottom surfaces). Each disk surface comprises a plurality of radially spaced, concentric data tracks, wherein each data track comprises a number of data sectors for storing user data. During write operations, the disk drive receives user data and a logical block address (LBA) which is mapped to an absolute block address (ABA) identifying one of the data sectors for storing the user data. The LBA to ABA mapping enables defective data sectors to be mapped to spare data sectors.

Figure 1:
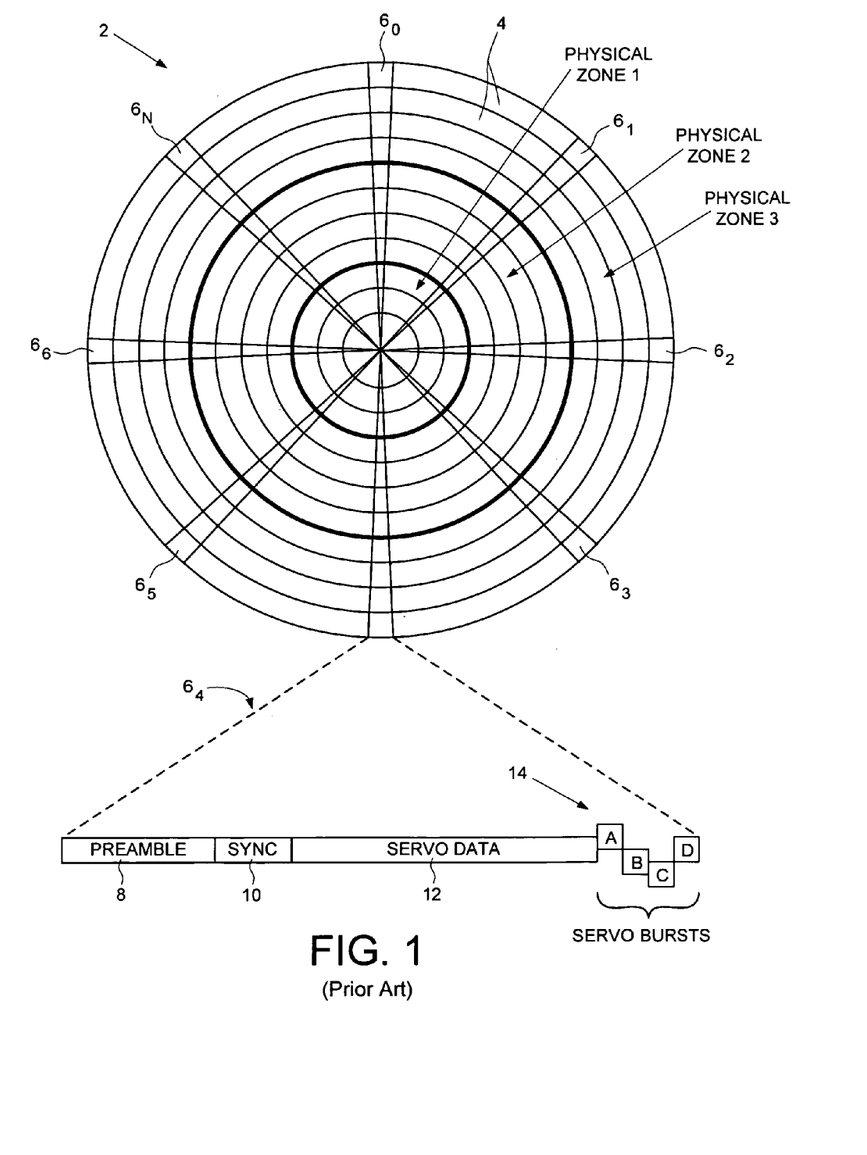
FIG. 1 shows a prior art disk format comprising a plurality of radially spaced, concentric data tracks banded together into a plurality of physical zones.

Because the disk is rotated at a constant velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1 which shows a prior art disk format 2 comprising a number of data tracks 4, wherein the data tracks are banded together in this example to form three physical zones from the inner diameter of the disk (ZONE 1) to the outer diameter of the disk (ZONE 3). The prior art disk format of FIG. 1 also comprises a number of embedded embedded servo sectors $6_0$-$6_N$ recorded around the circumference of each data track. Each servo sector $6_i$ comprises a preamble 8 for storing a periodic pattern which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ further comprises groups of servo bursts 14 (e.g., A, B, C and D bursts) which comprise a number of consecutive transitions recorded at precise intervals and offsets with respect to a data track centerline. The groups of servo bursts 14 provide fine head position information used for centerline tracking while accessing a data track during write/read operations.

Prior art disk drives typically configure the physical zones so that the zone boundaries occur at the same radial location across all disk surfaces, and so the data rate of each zone is the same across the disk surfaces. This is understood with reference to FIG. 1 by viewing the physical zone boundaries as cylinders extending through the disk surfaces so that each disk surface comprises three physical zones. In addition, the data rate is the same in each physical zone across the disk surfaces, for example, the data rate of physical zone 1 is the same for each disk surface. When a serpentine pattern is used to access the disk surfaces while reading a sequence of consecutive data sectors, the host transfer rate remains substantially constant since the data tracks are recorded at the same data rate from surface to surface (as long as the serpentine pattern does not cross a physical zone boundary). This results in a substantially constant stream of data sectors when viewed from the host, for example, when the host is running a benchmark program for quality verification.

A more recent development in disk drives is to optimize the data rate of each physical zone as well as the size of each physical zone relative to the characteristics of each head/disk interface. The radial density (tracks-per-inch (TPI)) may also be optimized for each disk surface which can also cause the size of each physical zone (and the corresponding physical zone boundaries) to differ across the disk surfaces. As a result, the data rate from surface to surface will change when reading a consecutive sequence of data sectors in a serpentine pattern that extends across the disk surfaces. This can lead to a varying host transfer rate depending on the current disk surface being accessed. When viewed from a host running a benchmark program, the varying transfer rate may suggest the disk drive is defective, when in fact nothing is wrong.

There is, therefore, a need to maintain a substantially constant average host transfer rate in a disk drive employing varying data rate data tracks across multiple disk surfaces.

SUMMARY OF THE INVENTION

An embodiment of the present invention comprises a disk drive having a plurality of disk surfaces, wherein each disk surface comprises a plurality of data tracks, and each data track comprises a plurality of data sectors. When a read command is received from a host, data is read from first and second data sectors on first and second disk surfaces, respectively, in response to the read command, wherein the first data sector stores data at a first data rate, and the second data sector stores data at a second data rate substantially less than the first data rate. The data is transferred to the host at a substantially constant average transfer rate.

In one embodiment, the data tracks of each disk surface are banded together into a plurality of physical zones, each physical zone having physical zone boundaries at predetermined radial locations on the disk surface, wherein each physical zone is operable to store data in data sectors at a predetermined data rate. In one embodiment, a first physical zone on the first disk surface comprise data stored in the first data sector at the first data rate, and a corresponding physical zone on the second disk surface comprises data stored in the second data sector at the second data rate.

In another embodiment, the physical zone boundaries of the disk surfaces are located at substantially the same radial locations. In one embodiment, the control circuitry is further operable to read data from a plurality of data sectors on the first disk surface in response to the read command without crossing a physical zone boundary on the first disk surface.

In yet another embodiment, the physical zone boundaries of a first physical zone on the first disk surface are located at substantially different radial locations than the physical zone boundaries of a corresponding physical zone on the second disk surface. In one embodiment, data is read from a plurality of data sectors on the first disk surface in response to the read command without crossing a physical zone boundary on the first disk surface, and data is read from a plurality of data sectors on the second disk surface in response to the read command without crossing a physical zone boundary on the second disk surface.

In still another embodiment, data is read from a first plurality of data sectors on the first disk surface and a second plurality of data sectors on the second disk surface, and the data is stored in a buffer memory. The data is then transferred from the buffer memory to the host at the substantially constant average transfer rate. In one embodiment, the substantially constant average transfer rate substantially equals the second data rate, and in another embodiment, the substantially constant average transfer rate is a transfer rate between the first data rate and the second data rate.

In another embodiment, data is read from a first plurality of data sectors in a first plurality of data tracks on the first disk surface and from a second plurality of data sectors in a second plurality of data tracks on the second disk surface. A first seek operation seeks the head from a current data track to a next data track on the first disk surface, and a second seek operation seeks the head from a current data track to a next data track on the second disk surface. A first rotational delay occurs after the first seek operation and prior to the control circuitry reading data from a data sector in the next data track on the first disk surface. A second rotational delay occurs after the second seek operation and prior to the control circuitry reading data from a data sector in the next data track on the second disk surface. The first rotational delay is substantially greater than the second rotational delay so that the control circuitry transfers the data to the host at the substantially constant average transfer rate. In one embodiment, each data track comprises a plurality of servo sectors separated by a servo sector rotational delay, the first rotational delay approximates a first integer multiple of the servo sector rotational delay, and the second rotational delay approximates a second integer multiple of the servo sector rotational delay.

Another embodiment of the present invention comprises a disk drive having a plurality of disk surfaces, wherein each disk surface comprises a plurality of data tracks, and each data track comprises a plurality of data sectors. When a write command is received from a host, write data is received from the host at a substantially constant average transfer rate in response to the write command. The write data is written to first and second data sectors on first and second disk surfaces, respectively, in response to the write command, wherein the first data sector stores data at a first data rate, and the second data sector stores data at a second data rate substantially less than the first data rate.

Another embodiment of the present invention comprises a method of operating a disk drive, the disk drive comprising a plurality of disk surfaces, wherein each disk surface comprises a plurality of data tracks, and each data track comprises a plurality of data sectors. When a read command is received from a host, data is read from first and second data sectors on first and second disk surfaces, respectively, in response to the read command, wherein the first data sector stores data at a first data rate, and the second data sector stores data at a second data rate substantially less than the first data rate. The data is transferred to the host at a substantially constant average transfer rate.

Another embodiment of the present invention comprises method of operating a disk drive, the disk drive comprising a plurality of disk surfaces, wherein each disk surface comprises a plurality of data tracks, and each data track comprises a plurality of data sectors. When a write command is received from a host, write data is received from the host at a substantially constant average transfer rate in response to the write command. The write data is written to first and second data sectors on first and second disk surfaces, respectively, in response to the write command, wherein the first data sector stores data at a first data rate, and the second data sector stores data at a second data rate substantially less than the first data rate.

DESCRIPTION OF THE PREFERRED EMBODIMENTS

Figure 2A:
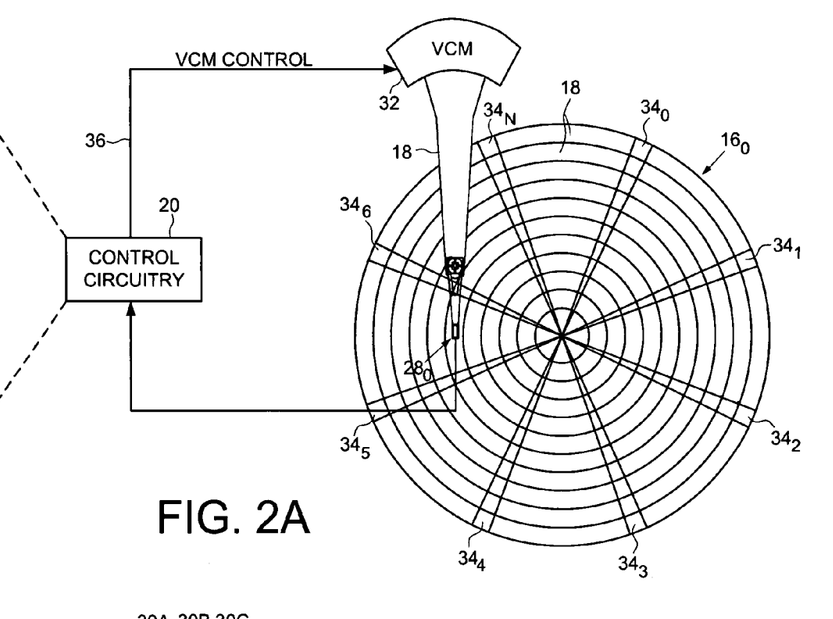
FIGS. 2A and 2B show a disk drive according to an embodiment of the present invention comprising a plurality of disk surfaces, and control circuitry for transferring data to/from a host at a substantially constant average transfer rate.
Figure 2B:
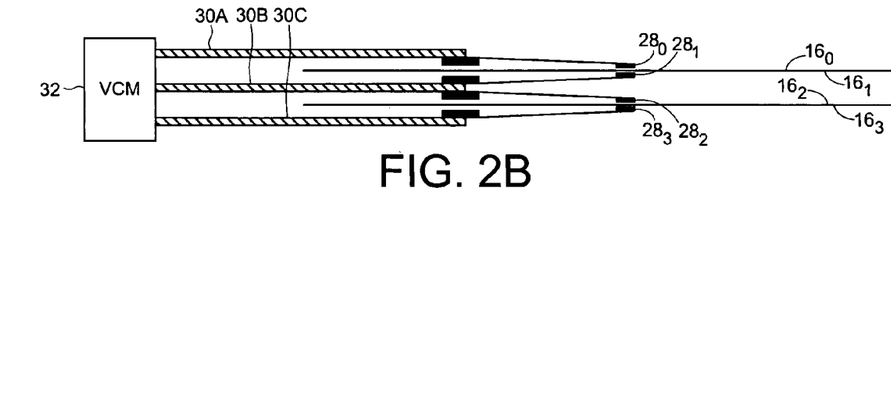
Figure 2C:
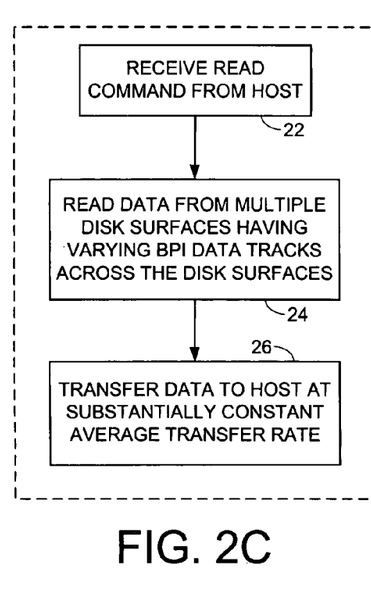
FIG. 2C is a flow diagram executed by the control circuitry of FIG. 2A for receiving a read command from a host, reading data from multiple disk surfaces having varying data rate data tracks across the disk surfaces, and transferring the data to the host at a substantially constant average transfer rate.

FIGS. 2A and 2B show a disk drive according to an embodiment of the present invention having a plurality of disk surfaces ($16_0$-$16_3$), wherein each disk surface (e.g., disk surface $16_0$) comprises a plurality of data tracks 18, and each data track comprises a plurality of data sectors. The disk drive further comprises control circuitry 20 operable to execute the flow diagram of FIG. 2C, wherein at step 22 a read command is received from the host. At step 24, data is read from first and second data sectors on first and second disk surfaces, respectively, in response to the read command, wherein the first data sector stores data at a first data rate, and the second data sector stores data at a second data rate substantially less than the first data rate. At step 26, the data is transferred to the host at a substantially constant average transfer rate.

In the embodiment of FIGS. 2A and 2B, the disk drive comprises a plurality of heads ($28_0$-$28_3$) actuated over respective disk surfaces ($16_0$-$16_3$). The heads ($28_0$-$28_3$) are attached to the distal ends of actuator arms (30A-30C) which are rotated about a pivot by a voice coil motor (VCM) 32 in order to position the heads ($28_0$-$28_3$) over the disk surfaces ($16_0$-$16_3$). Each disk surface ($16_0$-$16_3$) comprises a number of servo sectors ($34_0$-$34_N$) that store coarse head position information (e.g., a track address) used to position the head over a target data track during a seek operation, and fine head position information (e.g., servo bursts) used to maintain the head over the target data track during read/write operations. The control circuitry 20 processes the servo sectors ($34_0$-$34_N$) to generate a VCM control signal 36 applied to the VCM 32 in a closed loop servo system.

Any suitable control circuitry 20 may be employed in the embodiments of the present invention. In one embodiment, the control circuitry 20 comprises a microprocessor executing instructions, the instructions being operable to cause the microprocessor to perform the steps of FIG. 2C as well as other functions described herein. The instructions may be stored in any computer-readable medium. In one embodiment, they may be stored on a non-volatile semiconductor memory external to the microprocessor, or integrated with the microprocessor in a system on a chip (SOC). In another embodiment, the instructions are stored on the disk and read into a volatile semiconductor memory when the disk drive is powered on. In yet another embodiment, the control circuitry 20 comprises suitable logic circuitry, such as state machine circuitry.

As would be well understood by those of skill in the art, embodiments of the present invention may be implemented in any suitable disk drive, including magnetic disk drives, magneto-optical disk drives, and optical disk drives (CD-ROMs, DVD-ROMs, etc.).

Figure 3:
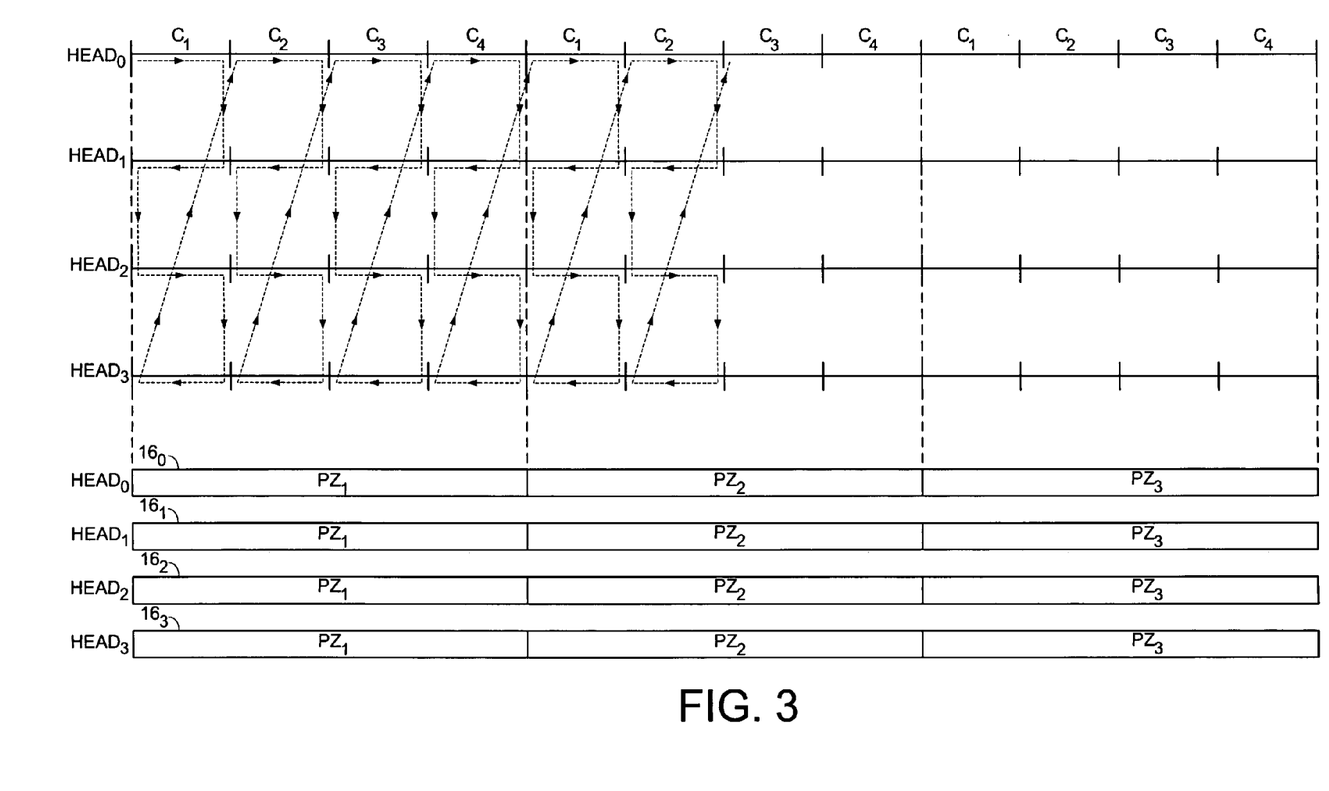
FIG. 3 shows an embodiment of the present invention wherein the physical zones are aligned vertically across the disk surfaces, and data is written/read to/from the disk in a serpentine pattern that does not cross a physical zone boundary for a given write/read command.

In one embodiment, the data tracks 18 of each disk surface are banded together into a plurality of physical zones, each physical zone having physical zone boundaries at predetermined radial locations on the disk surface, wherein each physical zone is operable to store data in data sectors at a predetermined data rate. FIG. 3 shows an embodiment of the present invention wherein the physical zone boundaries of the disk surfaces are located at substantially the same radial locations. In this example, each disk surface 16; comprises three physical zones $PZ_1$, $PZ_2$ and $PZ_3$, wherein a first physical zone on the first disk surface (e.g., $PZ_1$ on disk surface 160 stores data at a first data rate, and a corresponding physical zone on the second disk surface (e.g., $PZ_1$ on disk surface $16_1$) stores data at a second data rate different than the first data rate. Also in this embodiment, the data sectors are accessed in a serpentine pattern over a predetermined number of servo tracks that define a cluster $C_i$ as shown in FIG. 3. In one embodiment, data is read from a plurality of data sectors on a first disk surface in response to the read command without crossing a physical zone boundary on the first disk surface. That is, a cluster does not straddle a physical zone boundary on any disk surface, such that the serpentine pattern does not cross over a physical boundary (except after reading the data sectors from the last cluster of the last disk surface as shown). In this manner, when executing a read command the data rate changes only when the disk surface changes, for example, when changing from disk surface $16_0$ to disk surface $16_1$ following the serpentine pattern, whereas the data rate is constant while reading data from either disk surface (across a cluster).

Figure 5:
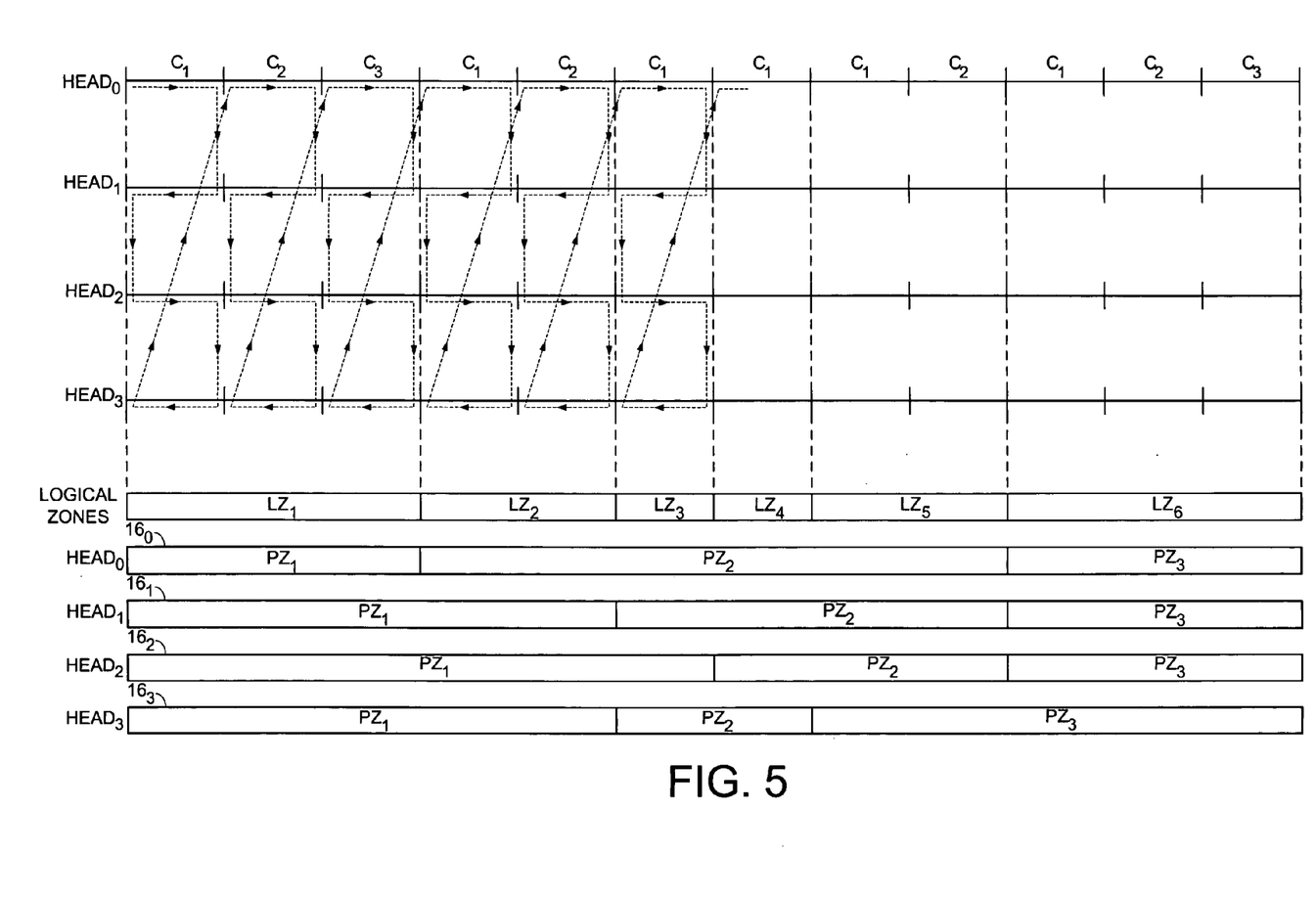
FIG. 5 shows an embodiment of the present invention wherein the physical zone boundaries define a plurality of logical zone boundaries used to map a block address received from a host to an absolute block address representing one of the data sectors.

FIG. 5 shows another example format for the disk surfaces ($16_0$-$16_3$) according to another embodiment of the present invention. In this example, each disk surface corresponding to heads ($28_0$-$28_3$) comprises three physical zones ($PZ_1$-$PZ_3$) having physical zone boundaries at predetermined radial locations. The physical zone $PZ_1$ on disk surface $16_0$ has a physical zone boundary (right boundary) at a first predetermined radial location, wherein the first predetermined radial location is substantially different from any of the radial locations of the physical zone boundaries on disk surface $16_1$. The physical zone $PZ_1$ on the disk surface $16_1$ has a physical zone boundary (right boundary) at a second predetermined radial location, wherein the second predetermined radial location is substantially different from any of the radial locations of the physical zone boundaries on disk surface $16_0$. These zone boundaries are substantially different to the extent that when the physical zones are accessed using a typical serpentine pattern, for example, the zone boundaries do not line up along the same cluster, as discussed in further detail below. A plurality of logical zone boundaries of logical zones ($LZ_1$-$LZ_6$) are defined relative to the physical zone boundaries in that a new logical zone boundary occurs whenever there is a change in any one of the physical zones on any disk surface. Accordingly, in this embodiment the number of logical zones is greater than the number of physical zones for at least one of the disk surfaces (six logical zones and three physical zones in the example of FIG. 5). Preferably, these logical zones are defined for at least two of the disk surfaces, and in one embodiment, one set of logical zones defines the logical zone boundaries for the entire drive.

In one embodiment, the data sectors of one of the physical zones on a first disk surface (e.g., $PZ_1$ on disk surface $16_0$) store data at a first data rate, and the data sectors of a corresponding physical zone on a second disk surface (e.g., $PZ_1$ on disk surface $16_1$) store data at a second data rate different than the first data rate. Corresponding means $PZ_1$ on disk surface $16_0$ corresponds to $PZ_1$ on disk surface $16_1$ regardless of their vertical alignment. In yet another embodiment, the data tracks on a first disk surface (e.g., disk surface $16_0$) comprise a first radial density, and the data tracks on a second disk surface (e.g., disk surface $16_1$) comprise a second radial density different than the first radial density.

Figure 4:
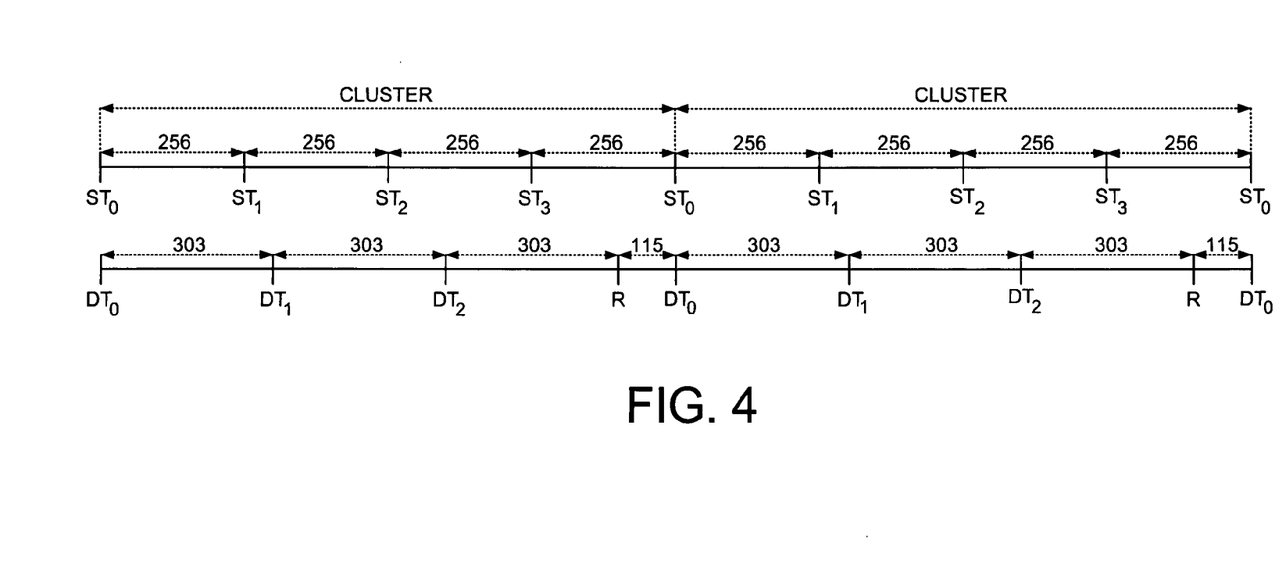
FIG. 4 shows an embodiment of the present invention wherein the control circuitry identifies a number of clusters, wherein each cluster comprises a first number of servo tracks and a second number of data tracks, and the first number of servo tracks is different than the second number of data tracks.

In still another embodiment, each disk surface comprises a plurality of servo tracks, and on at least one of the disk surfaces the radial density of the data tracks is different than the radial density of the servo tracks. This embodiment is illustrated in FIG. 4 which shows the format of servo tracks (ST) relative to the format of data tracks (DT). In this example, there are 256 quantized steps between the centerlines of each servo track, and 303 quantized steps between the centerlines of each data track. Therefore, the ratio of the radial density of servo tracks to data tracks is 256/303. Any suitable ratio of servo track density to data track density may be employed in the embodiments of the present invention.

In one embodiment, the control circuitry 20 is further operable to identify a plurality of clusters, wherein each cluster comprises a first number of servo tracks and a second number of data tracks, and the first number of servo tracks is different than the second number of data tracks. This embodiment is also illustrated in FIG. 4, wherein in this example each cluster comprises 4 full servo tracks (4×256=1024 steps) and 3 full data tracks (with a remainder of 115 steps as shown). In this embodiment, each cluster comprises an integer number of servo track spacings and a fractional number of data track spacings. Also in this embodiment, the data tracks are formatted such that the spacing of data tracks always begins relative to the start of a new cluster. In the example of FIG. 4, the spacing between the last data track of a current cluster and the first data track of the next cluster includes the remainder (303+115=418 steps). In an alternative embodiment, the remainder is distributed across the data tracks in any suitable manner so that the spacing between data tracks is substantially even.

Any suitable radial density may be selected for the data tracks in step increments, with the minimum distance between data tracks being the distance between servo tracks (256 steps). This allows the data track density (tracks per inch) as well as the linear density (bits per inch) to be optimized for each head/surface, while enabling a convenient mapping of host block addresses to target data sectors.

Similar to the embodiment of FIG. 3, in FIG. 5 the data sectors are accessed in a serpentine pattern over a predetermined number of servo tracks that define a cluster $C_i$. In one embodiment, data is read from a plurality of data sectors on a first disk surface and a second disk surface in response to the read command without crossing a physical zone boundary on either the first disk surface or the second disk surface. That is, a cluster does not straddle a physical zone boundary on any disk surface, such that the serpentine pattern does not cross over a physical boundary (except after reading the data sectors from the last cluster of the last disk surface as shown). In this manner, when executing a read command the data rate changes only when the disk surface changes, for example, when changing from disk surface $16_0$ to disk surface $16_1$ following the serpentine pattern, whereas the data rate is constant while reading data from either disk surface (across a cluster).

Figure 6A:
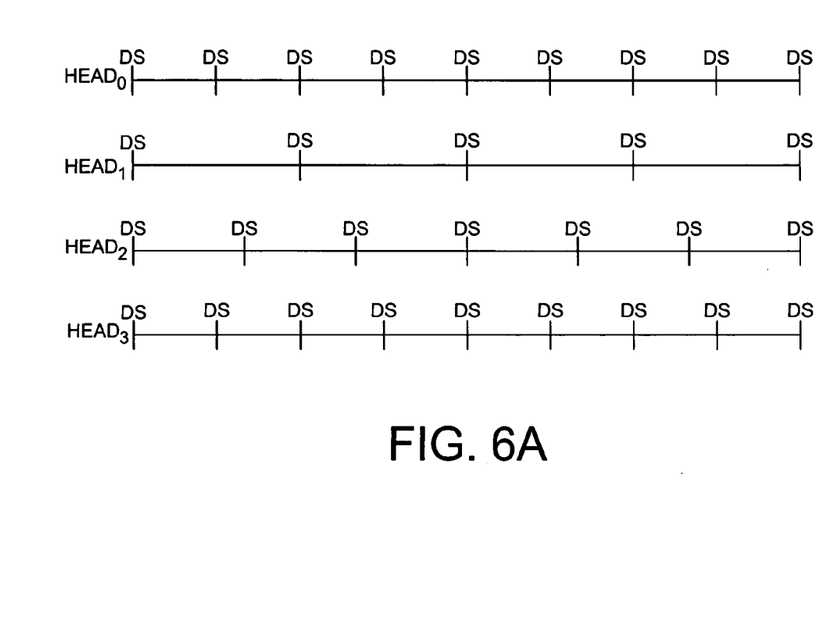
FIGS. 6A and 6B show an embodiment of the present invention which reads data from data sectors having a varying linear bit density across the disk surfaces, and transferring the data sectors buffered in a buffer memory to the host at a substantially constant average transfer rate.
Figure 6B:
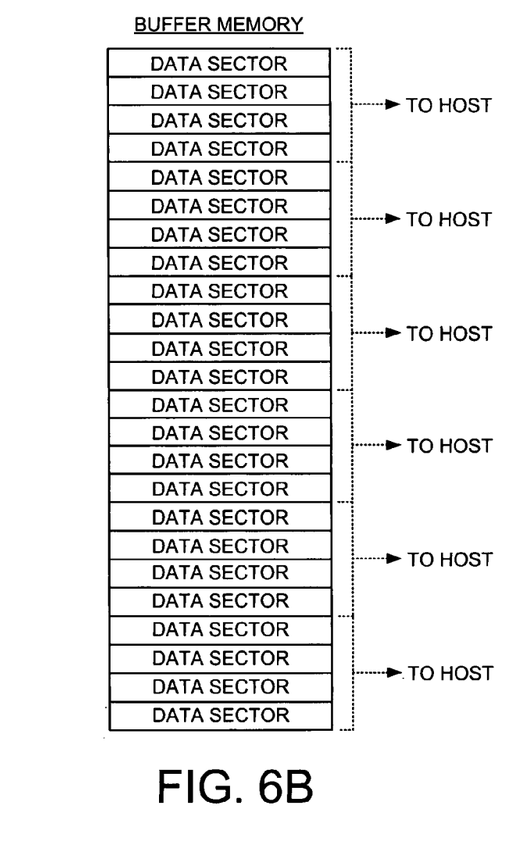

FIGS. 6A and 6B show another embodiment of the present invention wherein the control circuitry 20 is further operable to read data from a plurality of data sectors on a plurality of disk surfaces, wherein the data is stored in a buffer memory and then transferred to the host at a substantially constant average transfer rate. FIG. 6A illustrates that the data rate (BPI) varies across the disk surfaces as illustrated by the varying number of data sectors (DS) per data track. This means that when the control circuitry 20 is reading data from a higher data rate data track on a first disk surface, more data sectors are stored in the buffer memory as compared to reading a lower data rate data track on a second disk surface. In order to smooth the data transfer rate to the host for a given read command, the control circuitry 20 transfers a predetermined number of data sectors at a time regardless as to the number of data sectors being read from the current track. In the example of FIG. 6A, the lowest data rate disk surface (disk surface $16_1$) comprises four data sectors per data track. In the embodiment shown in FIG. 6B, the control circuitry 20 transfers a corresponding number of data sectors to the host (four data sectors) in order to smooth the data transfer rate. When reading data from higher data rate disk surfaces (e.g., disk surface $16_0$), the data sectors are buffered faster in the buffer memory, but the data transfer rate to the host remains substantially constant on average (e.g., four data sectors per unit time).

Any suitable data transfer rate may be employed in the embodiments of the invention, and in one embodiment, the data transfer rate is selected somewhere between the highest and lowest data rates out of all the disk surfaces. In addition, the host data transfer rate may vary depending on the physical or logical zone being accessed for a given read operation. In one embodiment, the control circuitry 20 selects a large group of data sectors to transfer at a time and employs a suitable delay between each host transfer to ensure there is always a sufficient number of data sectors buffered in the buffer memory to prevent a data transfer rate underflow condition. In another embodiment, the control circuitry 20 selects a lower number of data sectors to transfer at a time with a suitable delay between each host transfer such that the buffer memory may overflow, particularly when reading data sectors from a high data rate disk surface, thereby causing the control circuitry 20 to "slip" a revolution of the disk in order to reread the current data track. In this embodiment, the buffer memory stores a sufficient number of data sectors to prevent a data transfer rate underflow condition during the slipped revolution.

Figure 6C:
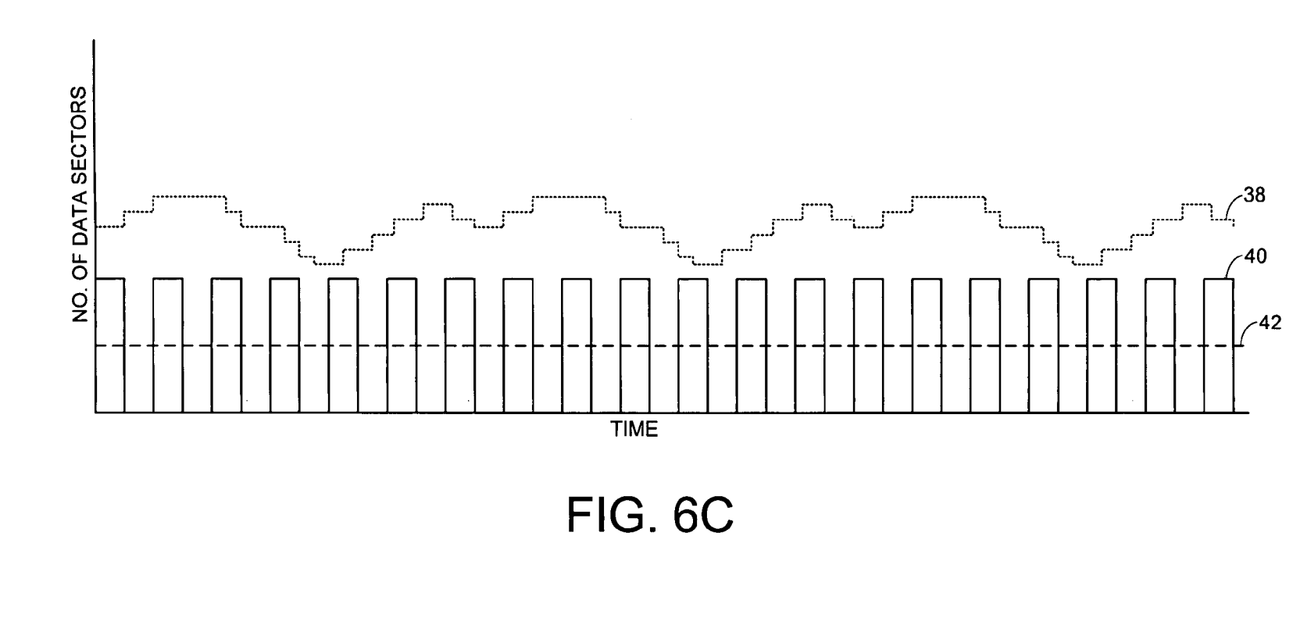
FIG. 6C illustrates how in the embodiment of FIGS. 6A and 6B the host transfer rate remains substantially constant on average for a given read operation.

FIG. 6C illustrates how in the embodiment of FIGS. 6A and 6B the host transfer rate remains substantially constant on average for a given read operation. Waveform 38 represents the number of data sectors stored in the buffer memory of FIG. 6B which varies over time depending on the data rate of the data tracks on the current disk surface. Waveform 40 represents the predetermined number of data sectors transferred to the host (four in the example of FIG. 6B), with a predetermined delay between transfers to ensure the buffer memory always stores a sufficient number of data sectors. Waveform 42 represents the substantially constant average transfer rate to the host.

Figure 7A:
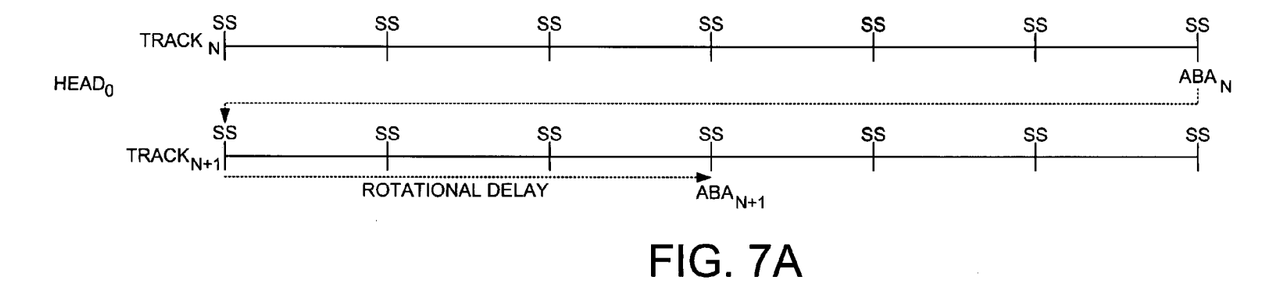
FIGS. 7A and 7B illustrate an embodiment of the present invention wherein a rotational delay from track-to-track is used to slow down the transfer rate to/from higher data rate data tracks.
Figure 7B:
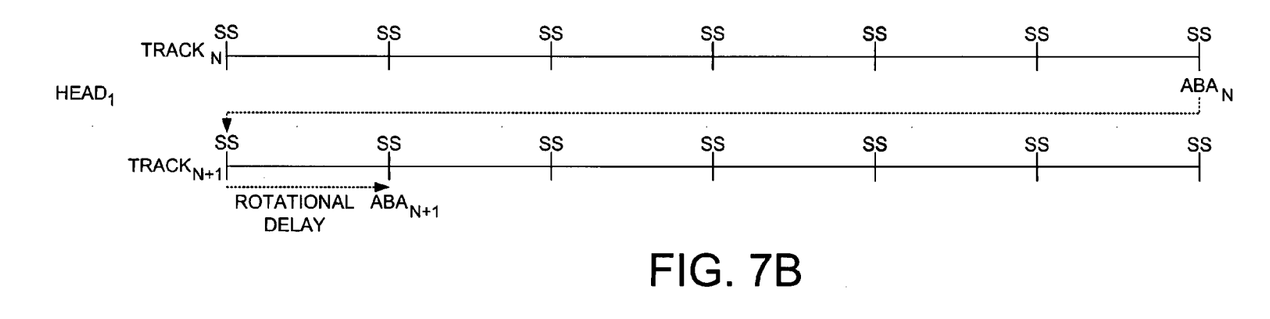

FIGS. 7A and 7B illustrate an alternative embodiment of the present invention for maintaining a substantially constant average transfer rate to the host. In this embodiment, the control circuitry 20 reads the data from a first plurality of data sectors in a first plurality of data tracks on a first disk surface (FIG. 7A) and a second plurality of data sectors in a second plurality of data tracks on a second disk surface (FIG. 7B). The control circuitry performs a first seek operation to seek the head from a current data track to a next data track on the first disk surface, and a second seek operation to seek the head from a current data track to a next data track on the second disk surface. A first rotational delay (FIG. 7A) occurs after the first seek operation and prior to the control circuitry 20 reading data from a data sector in the next data track on the first disk surface. A second rotational delay (FIG. 7B) occurs after the second seek operation and prior to the control circuitry 20 reading data from a data sector in the next data track on the second disk surface. The first rotational delay (FIG. 7A) is substantially greater than the second rotational delay (FIG. 7B) so that the control circuitry 20 transfers the data to the host at a substantially constant average transfer rate. In other words, the rotational delay associated with a track-to-track seek effectively adjusts the host transfer rate based on the data rate of each disk surface. Higher data rate disk surfaces have an increased rotational delay, thereby slowing the host transfer rate as compared to a lower data rate disk surface which has a smaller rotational delay.

In the embodiment of FIGS. 7A and 7B, each data track comprises a plurality of servo sectors (SS) separated by a servo sector rotational delay. The first rotational delay approximates a first integer multiple of the servo sector rotational delay, and the second rotational delay approximates a second integer multiple of the servo sector rotational delay. In this embodiment, the address of each data sector is determined relative to the servo sectors (SS). The rotational delay is selected for each disk surface by assigning an absolute block address (ABA) to the data sectors relative to the servo sectors. Referring to FIG. 7A, the address of the last data sector of track N ($ABA_N$) is followed by $ABA_{N+1}$ which is assigned to a data sector following the fourth servo sector on track N+1. In FIG. 7B, the last data sector of track N ($ABA_N$) is followed by $ABA_{N+1}$ which is assigned to a data sector following the second servo sector on track N+1.

Figure 7C:
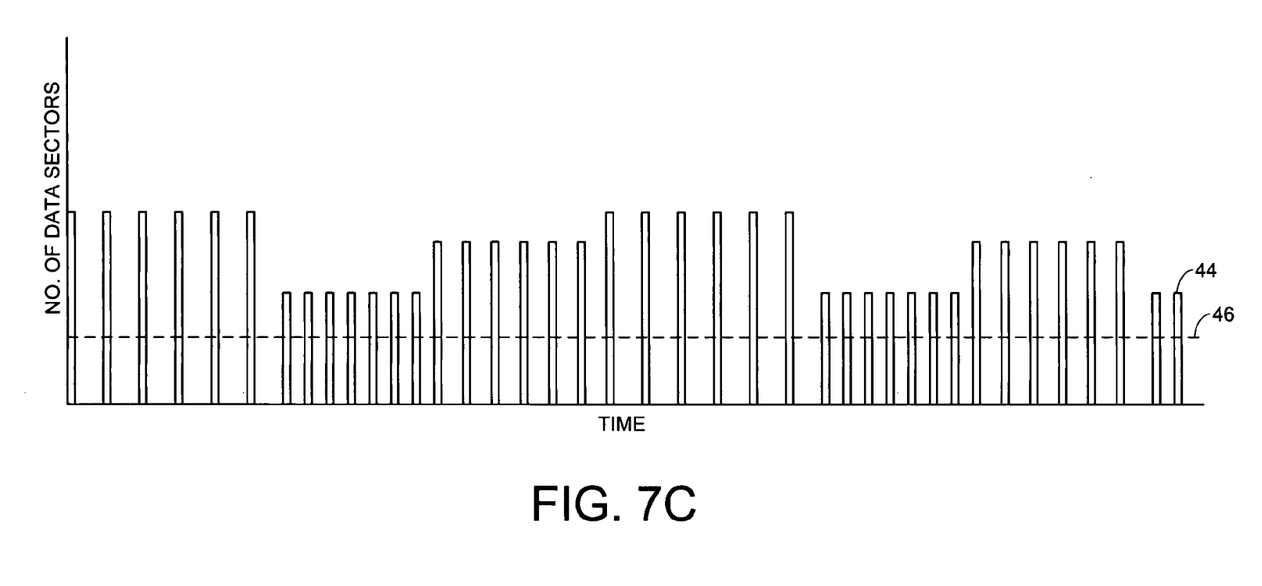
FIG. 7C illustrates how in the embodiment of FIGS. 7A and 7B the host transfer rate remains substantially constant on average for a given read operation.

FIG. 7C illustrates how in the embodiment of FIGS. 7A and 7B the host transfer rate remains substantially constant on average for a given read operation. Waveform 44 represents the data sectors transferred to the host from data tracks of different disk surfaces. For higher data rate data tracks, the number of data sectors transferred per data track is high, but the delay between data tracks is longer (due to the greater rotational delay). Consequently, the average transfer rate represented by waveform 46 remains substantially constant on average.

Figure 8:
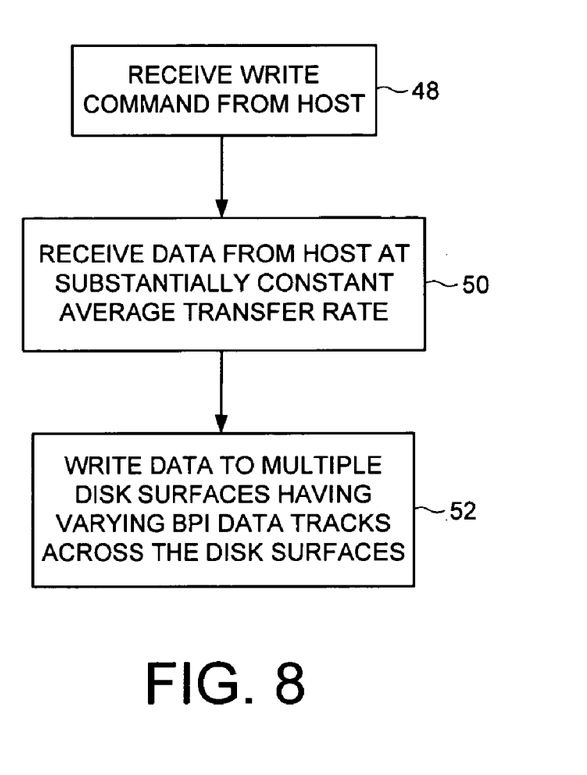
FIG. 8 is a flow diagram executed by the control circuitry of FIG. 2A for receiving a write command from the host, receiving write data from the host at a substantially constant average transfer rate, and writing the data to multiple disk surfaces having varying data rate data tracks across the disk surfaces.

FIG. 8 shows a flow diagram executed by the control circuitry 20 according to another embodiment of the present invention for implementing a write operation. At step 48 a write command is received from a host, and at step 50 write data is received from the host at a substantially constant average transfer rate in response to the write command. At step 52 the write data is written to first and second data sectors on first and second disk surfaces, respectively, in response to the write command, wherein the first data sector stores data at a first data rate, and the second data sector stores data at a second data rate substantially less than the first data rate. In one embodiment, the control circuitry 20 implements the substantially constant average transfer rate by allowing a predetermined number of data sectors to be transferred from the host at a time, regardless as to the data rate of the current disk surface being accessed. In one embodiment, the control circuitry 20 buffers the write data in a buffer memory (similar to FIG. 6B) and provides a "buffer full" message to the host after each transfer of N data sectors. Similar to the embodiment of FIGS. 6A and 6B, the number of data sectors buffered in the buffer memory fluctuates depending on the data rate of the disk surface currently being accessed. In an alternative embodiment, the technique of varying the rotational delay from track-to-track, as illustrated in FIGS. 7A and 7B, is used to achieve a substantially constant average host transfer rate during a write command.

In the embodiments of the present invention, the host transfer rate remains substantially constant on average for a given read operation within any suitable tolerance, such as within a predetermined percentage of deviation. In one embodiment, the average transfer rate remains within the tolerance of a benchmark program so that the benchmark program will not consider the disk drive abnormal even though the average transfer rate may vary slightly for a given read command.

We claim:
1. A disk drive comprising:
(a) a plurality of disk surfaces, wherein each disk surface comprises a plurality of data tracks, and each data track comprises a plurality of data sectors; and
(b) control circuitry operable to:
  receive a read command from a host;
  read data from first and second data sectors on first and second disk surfaces, respectively, in response to the read command, wherein:
    the first data sector stores data at a first data rate, and the second data sector stores data at a second data rate substantially less than the first data rate;
  transfer the data to the host at a substantially constant average transfer rate, wherein the substantially constant average transfer rate is a transfer rate between the first data rate and the second data rate;
  read the data from a first plurality of data sectors in a first plurality of data tracks on the first disk surface and from a second plurality of data sectors in a second plurality of data tracks on the second disk surface; and
  perform a first seek operation to seek a head from a current data track to a next data track on the first disk surface, and a second seek operation to seek the head from a current data track to a next data track on the second disk surface;
  wherein:
    a first rotational delay occurs after the first seek operation and prior to the control circuitry reading data from a data sector in the next data track on the first disk surface;
    a second rotational delay occurs after the second seek operation and prior to the control circuitry reading data from a data sector in the next data track on the second disk surface; and
    the first rotational delay is substantially greater than the second rotational delay so that the control circuitry transfers the data to the host at the substantially constant average transfer rate.

2. The disk drive as recited in claim 1, wherein the data tracks of each disk surface are banded together into a plurality of physical zones, each physical zone having physical zone boundaries at predetermined radial locations on the disk surface, wherein each physical zone is operable to store data in data sectors at a predetermined data rate.

3. The disk drive as recited in claim 2, wherein:
a first physical zone on the first disk surface comprises data stored in the first data sector at the first data rate; and
a corresponding physical zone on the second disk surface comprises data stored in the second data sector at the second data rate.

4. The disk drive as recited in claim 2, wherein the physical zone boundaries of the disk surfaces are located at substantially the same radial locations.

5. The disk drive as recited in claim 4, wherein the control circuitry is further operable to read data from a plurality of data sectors on the first disk surface in response to the read command without crossing a physical zone boundary on the first disk surface.

6. The disk drive as recited in claim 2, wherein the physical zone boundaries of a first physical zone on the first disk surface are located at substantially different radial locations than the physical zone boundaries of a corresponding physical zone on the second disk surface.

7. The disk drive as recited in claim 6, wherein the control circuitry is further operable to:
read data from a plurality of data sectors on the first disk surface in response to the read command without crossing a physical zone boundary on the first disk surface; and
read data from a plurality of data sectors on the second disk surface in response to the read command without crossing a physical zone boundary on the second disk surface.

8. The disk drive as recited in claim 1, wherein:
the control circuitry is further operable to read the data from a first plurality of data sectors on the first disk surface and a second plurality of data sectors on the second disk surface;
the disk drive further comprises a buffer memory operable to store the data read from the first and second pluralities of data sectors; and
the control circuitry is further operable to transfer the data from the buffer memory to the host at the substantially constant average transfer rate.

9. The disk drive as recited in claim 1, wherein:
each data track comprises a plurality of servo sectors separated by a servo sector rotational delay;
the first rotational delay approximates a first integer multiple of the servo sector rotational delay; and the second rotational delay approximates a second integer multiple of the servo sector rotational delay.

10. The disk drive as recited in claim 1, wherein the control circuitry is operable to read data from a single disk surface at a time.

11. A disk drive comprising:
(a) a plurality of disk surfaces, wherein each disk surface comprises a plurality of data tracks, and each data track comprises a plurality of data sectors;
(b) control circuitry operable to:
receive a write command from a host;
receive write data from the host at a substantially constant average transfer rate in response to the write command; and
write the write data to first and second data sectors on first and second disk surfaces, respectively, in response to the write command, wherein:
the first data sector stores data at a first data rate;
the second data sector stores data at a second data rate substantially less than the first data rate; and
the substantially constant average transfer rate is a transfer rate between the first data rate and the second data rate;
read the data from a first plurality of data sectors in a first plurality of data tracks on the first disk surface and from a second plurality of data sectors in a second plurality of data tracks on the second disk surface; and
perform a first seek operation to seek a head from a current data track to a next data track on the first disk surface, and a second seek operation to seek the head from a current data track to a next data track on the second disk surface;
wherein:
a first rotational delay occurs after the first seek operation and prior to the control circuitry reading data from a data sector in the next data track on the first disk surface;
a second rotational delay occurs after the second seek operation and prior to the control circuitry reading data from a data sector in the next data track on the second disk surface; and
the first rotational delay is substantially greater than the second rotational delay so that the control circuitry transfers the data to the host at the substantially constant average transfer rate.

12. The disk drive as recited in claim 11, wherein the control circuitry is operable to write data to a single disk surface at a time.

13. A method of operating a disk drive, the disk drive comprising a plurality of disk surfaces, wherein each disk surface comprises a plurality of data tracks, and each data track comprises a plurality of data sectors, the method comprising the steps of:
receiving a read command from a host;
reading data from first and second data sectors on first and second disk surfaces, respectively, in response to the read command, wherein:
the first data sector stores data at a first data rate, and
the second data sector stores data at a second data rate substantially less than the first data rate;
transferring the data to the host at a substantially constant average transfer rate, wherein the substantially constant average transfer rate is a transfer rate between the first data rate and the second data rate;
reading data from a first plurality of data sectors in a first plurality of data tracks on the first disk surface and from a second plurality of data sectors in a second plurality of data tracks on the second disk surface; and
performing a first seek operation to seek a head from a current data track to a next data track on the first disk surface, and a second seek operation to seek the head from a current data track to a next data track on the second disk surface, wherein:
a first rotational delay occurs after the first seek operation and prior to reading data from a data sector in the next data track on the first disk surface;
a second rotation delay occurs after the second seek operation and prior to reading data from a data sector in the next data track on the second disk surface; and
the first rotational delay is substantially greater than the second rotational delay so that the data is transferred to the host at the substantially constant average transfer rate.

14. The method as recited in claim 13, wherein the data tracks of each disk surface are banded together into a plurality of physical zones, each physical zone having physical zone boundaries at predetermined radial locations on the disk surface, wherein each physical zone is operable to store data in data sectors at a predetermined data rate.

15. The method as recited in claim 14, wherein:
a first physical zone on the first disk surface comprises data stored in the first data sector at the first data rate; and
a corresponding physical zone on the second disk surface comprises data stored in the second data sector at the second data rate.

16. The method as recited in claim 14, further comprising reading data from a plurality of data sectors on the first disk surface in response to the read command without crossing a physical zone boundary on the first disk surface.

17. The method as recited in claim 14, wherein the physical zone boundaries of a first physical zone on the first disk surface are located at substantially different radial locations than the physical zone boundaries of a corresponding physical zone on the second disk surface.

18. The method as recited in claim 17, wherein:
the step of reading data from the first data sectors comprises the step of reading data from a plurality of data sectors on the first disk surface in response to the read command without crossing a physical zone boundary on the first disk surface; and
the step of reading data from the second data sectors comprises the step of reading data from a plurality of data sectors on the second disk surface in response to the read command without crossing a physical zone boundary on the second disk surface.

19. The method as recited in claim 13, wherein:
the step of reading the data from the first and second data sectors comprises the step of reading the data from a first plurality of data sectors on the first disk surface and a second plurality of data sectors on the second disk surface;
the disk drive further comprises a buffer memory operable to store the data read from the first and second pluralities of data sectors; and
the step of transferring the data to the host comprises the step of transferring the data from the buffer memory to the host at the substantially constant average transfer rate.

20. The method as recited in claim 13, wherein:
each data track comprises a plurality of servo sectors separated by a servo sector rotational delay;
the first rotational delay approximates a first integer multiple of the servo sector rotational delay; and the second rotational delay approximates a second integer multiple of the servo sector rotational delay.

21. The method as recited in claim 13, wherein the step of reading data comprising reading data from a single disk surface at a time.

22. A method of operating a disk drive, the disk drive comprising a plurality of disk surfaces, wherein each disk surface comprises a plurality of data tracks, and each data track comprises a plurality of data sectors, the method comprising the steps of:
  receiving a write command from a host;
  receiving write data from the host at a substantially constant average transfer rate in response to the write command;
  writing the write data to first and second data sectors on first and second disk surfaces, respectively, in response to the write command, wherein:
    the first data sector stores data at a first data rate,
    the second data sector stores data at a second data rate substantially less than the first data rate; and
    the substantially constant average transfer rate is a transfer rate between the first data rate and the second data rate;
  reading data from a first plurality of data sectors in a first plurality of data tracks on the first disk surface and from a second plurality of data sectors in a second plurality of data tracks on the second disk surface; and
  performing a first seek operation to seek a head from a current data track to a next data track on the first disk surface, and a second seek operation to seek the head from a current data track to a next data track on the second disk surface, wherein:
    a first rotational delay occurs after the first seek operation and prior to reading data from a data sector in the next data track on the first disk surface;
    a second rotation delay occurs after the second seek operation and prior to reading data from a data sector in the next data track on the second disk surface; and
    the first rotational delay is substantially greater than the second rotational delay so that the data is transferred to the host at the substantially constant average transfer rate.

23. The method as recited in claim 22, wherein the step of writing data comprising writing data to a single disk surface at a time.

* * * * *